(12) United States Patent
Jiang et al.

(10) Patent No.: US 11,313,971 B1
(45) Date of Patent: Apr. 26, 2022

(54) THREE-DIMENSIONAL IMAGING SYSTEM AND METHOD

(71) Applicant: BEIJING INSTITUTE OF TECHNOLOGY, Beijing (CN)

(72) Inventors: Lan Jiang, Beijing (CN); Baoshan Guo, Beijing (CN); Tianyong Zhang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/387,561

(22) Filed: Jul. 28, 2021

(30) Foreign Application Priority Data

Jan. 21, 2021 (CN) .......................... 202110079694.2

(51) Int. Cl.
    *G01C 3/08*     (2006.01)
    *G01S 17/894*     (2020.01)
    (Continued)

(52) U.S. Cl.
CPC ........ *G01S 17/894* (2020.01); *G01B 11/2513* (2013.01); *G01S 7/484* (2013.01); *H04N 5/372* (2013.01)

(58) Field of Classification Search
None
See application file for complete search history.

(56) References Cited

U.S. PATENT DOCUMENTS

| 5,014,207 A | 5/1991 | Lawton |
| 2014/0217074 A1 | 8/2014 | Thor |

(Continued)

FOREIGN PATENT DOCUMENTS

| CN | 103616330 A | 3/2014 |
| CN | 103917914 A | 7/2014 |

(Continued)

OTHER PUBLICATIONS

State Intellectual Property Office of People's Republic of China, First Office Action for Chinese Patent Application No. 202110079694. 2, dated Sep. 28, 2021, 16 Pages (including translation).

(Continued)

*Primary Examiner* — Mark Hellner
(74) *Attorney, Agent, or Firm* — Brooks Kushman P.C.

(57) ABSTRACT

A three-dimensional imaging system and method are provided. The three-dimensional imaging system includes: an ultrashort pulse laser light source configured to generate a detection beam; a supercontinuum spectrum generator configured to generate a supercontinuum spectrum based on the detection beam passing through the supercontinuum spectrum generator; a pulse separation delayer configured to generate a continuous pulse sequence of different wavelengths with a time interval based on the supercontinuum spectrum; a multi-frequency pulse interference fringe generator configured to generate multi-frequency interference fringe patterns of different wavelength ranges with a time interval based on the continuous pulse sequence; and an image acquisition device configured to acquire an optical signal reflected by a sample irradiated by the multi-frequency interference fringe patterns to obtain a three-dimensional topography of the sample.

18 Claims, 3 Drawing Sheets

(51) Int. Cl.
*H04N 5/372* (2011.01)
*G01B 11/25* (2006.01)
*G01S 7/484* (2006.01)

(56) References Cited

U.S. PATENT DOCUMENTS

| | | |
|---|---|---|
| 2014/0293388 A1 | 10/2014 | Matsumoto et al. |
| 2015/0129565 A1 | 5/2015 | Gauch et al. |
| 2018/0290235 A1 | 10/2018 | Webster et al. |
| 2019/0162520 A1* | 5/2019 | Shaked .............. G01B 11/2441 |

FOREIGN PATENT DOCUMENTS

| | | | |
|---|---|---|---|
| CN | 104302438 A | | 1/2015 |
| CN | 106166643 A | | 11/2016 |
| CN | 106813637 A | | 6/2017 |
| CN | 107462546 A | | 12/2017 |
| CN | 108213718 A | | 6/2018 |
| CN | 108413867 A | | 8/2018 |
| CN | 109196333 A | | 1/2019 |
| CN | 109443215 A | | 3/2019 |
| CN | 109444140 A | | 3/2019 |
| CN | 109632729 A | | 4/2019 |
| CN | 10979967 A | * 5/2019 | ............. G03B 39/00 |
| CN | 109799196 A | | 5/2019 |
| CN | 110744211 A | | 2/2020 |
| CN | 111141701 A | | 5/2020 |
| CN | 111610254 A | | 9/2020 |
| EP | 3385770 A1 | | 10/2018 |
| EP | 3543742 A1 | * 9/2019 | ............. G01S 17/89 |
| JP | 2003025455 A | | 1/2003 |
| JP | 2004314640 A | | 11/2004 |
| JP | 20170766038 A | * 4/2017 | ............... G03H 1/12 |
| KR | 20160115180 A | | 10/2016 |

OTHER PUBLICATIONS

Zhang, Shian et al., "Ultra-fast Pulse Shaping and its Applications," 10th National Symposium on Frontiers of Optics, Dec. 31, 2014, No. 1, p. 123, (2 Pages).

Su et al., "Patterned Microlens Processed Using Two-photon Polymerization of Femtosecond Laser and its Imaging Test," Optics and Precision Engineering, Dec. 31, 2020, pp. 2629-2635, vol. 28, No. 12, 7 Pages.

Wang et al., "Design of 3D Laser Imaging Receiver Based on 8×8 APD Detector Array," Chinese Optics, Jun. 2015, pp. 422-427, vol. 8, No. 3, China Academic Journal Publishing House, 6 Pages.

* cited by examiner

THREE-DIMENSIONAL IMAGING SYSTEM AND METHOD

CROSS-REFERENCE TO RELATED APPLICATION

This application claims the priority of Chinese Patent Application No. 202110079694.2 filed on Jan. 21, 2021, which is hereby incorporated by reference in its entirety.

TECHNICAL FIELD

The present disclosure relates to a three-dimensional imaging system and method, in particular to an ultrafast continuous three-dimensional imaging system and method for ablating objects by ultrashort pulse laser, and belongs to the field of ultrafast imaging.

BACKGROUND

Ultrashort pulse laser has a relatively short time scale (ns-ps-fs) and a relatively high energy density ($>10^{14}$ $W/cm^2$), which may be used to process some fine and complex micro-nano structures on a surface or inside of materials. However, an interaction between the ultrashort pulse laser and materials is a transient process, and the mechanism phenomenon (for example laser shock wave front propagation, material molecular relaxation vibration and so on in picosecond time scale; molecular structure movement, semiconductor carrier movement, plasma formation and so on in femtosecond time scale) is not easy to observe. Although the processing mechanism of the processed material may be explained by its surface or internal topography, the mechanism of an intermediate reaction process may be complicated.

SUMMARY

According to at least one embodiment of the present disclosure, there is provided a three-dimensional imaging system, including: an ultrashort pulse laser light source configured to generate a detection beam; a supercontinuum spectrum generator configured to generate a supercontinuum spectrum based on the detection beam passing through the supercontinuum spectrum generator; a pulse separation delayer configured to generate a continuous pulse sequence of different wavelengths with a time interval based on the supercontinuum spectrum; a multi-frequency pulse interference fringe generator configured to generate multi-frequency interference fringe patterns of different wavelength ranges with a time interval based on the continuous pulse sequence; and an image acquisition device configured to acquire an optical signal reflected by a sample irradiated by the multi-frequency interference fringe patterns to obtain a three-dimensional topography of the sample.

In an exemplary embodiment, the system further includes a first beam splitting-combining mirror, the first beam splitting-combining mirror is configured to equally divide the continuous pulse sequence generated by the pulse separation delayer into a first pulse sequence and a second pulse sequence, and the multi-frequency pulse interference fringe generator generates the multi-frequency interference fringe patterns based on the first pulse sequence and the second pulse sequence.

In an exemplary embodiment, the system further includes a plurality of first binomial color mirrors, wherein a plurality of first sub-pulse sequences of different wavelength ranges are generated by the first pulse sequence through the plurality of first binomial mirrors, respectively, and the plurality of first sub-pulse sequences converge with the second pulse sequence to form a one-to-one coincidence relationship in time and band.

In an exemplary embodiment, the system further includes a plurality of second beam splitting-combining mirrors, the plurality of second beam splitting-combining mirrors are configured to split the second pulse sequence to form a plurality of second sub-pulse sequences of different wavelength ranges, and the plurality of first sub-pulse sequences of different wavelength ranges converge with the plurality of second sub-pulse sequences of different wavelength ranges respectively, to form the one-to-one coincidence relationship in time and band.

In an exemplary embodiment, the system further includes a plurality of second binomial color mirrors, wherein the image acquisition device includes a plurality of Charge Coupled Device (CCD) cameras corresponding to the plurality of second binomial color mirrors, the optical signal reflected by the samples irradiated by the multi-frequency interference fringe patterns respectively enter the plurality of CCD cameras through the plurality of second binomial color mirrors, and the plurality of CCD cameras respectively acquire optical signals passing through the plurality of second binomial color mirrors to obtain the three-dimensional topography of the sample.

In an exemplary embodiment, the system further includes a third beam splitting-combining mirror, the third beam splitting-combining mirror is configured to split light generated by the ultrashort pulse laser light source into the detection beam and a pump beam, and the pump beam is used for ablating the sample.

In an exemplary embodiment, the system further includes a polarizer, wherein the polarizer is configured to adjust a polarization state of the pump beam to be different from that of the detection beam to ablate the sample.

In an exemplary embodiment, the system further includes a delay platform and a lens, wherein the pump beam having the polarization state adjusted is delayed through the delay platform, and then is focused on the sample through the lens to ablate the sample.

In an exemplary embodiment, the plurality of first binomial color mirrors have different cut-off frequencies, and the plurality of second binomial color mirrors have cut-off frequencies corresponding to the plurality of first binomial color mirrors one by one.

In an exemplary embodiment, the supercontinuum spectrum generator includes a focusing objective lens and a photonic crystal fiber.

In an exemplary embodiment, the plurality of CCD cameras are located at different positions of the three-dimensional imaging system and respectively receive interference fringe patterns with sample contour information reflected by the sample.

According to at least one embodiment of the present disclosure, there is also provided a three-dimensional imaging method, including: generating, by an ultrashort pulse laser source, a detection beam; generating, by a supercontinuum spectrum generator, based on the detection beam passing through the supercontinuum spectrum generator, a supercontinuum spectrum; generating a continuous pulse sequence of different wavelengths with a time interval based on the supercontinuum spectrum; generating multi-frequency interference fringe patterns of different wavelength ranges with a time interval based on the continuous pulse sequence; and acquiring an optical signal reflected by a sample irradiated by the multi-frequency interference fringe patterns to obtain a three-dimensional topography of the sample.

In an exemplary embodiment, the generating multi-frequency interference fringe patterns of different wavelength ranges with the time interval based on the continuous pulse sequence includes: equally dividing the continuous pulse sequence into a first pulse sequence and a second pulse sequence; and generating the multi-frequency interference fringe patterns based on the first pulse sequence and the second pulse sequence.

In an exemplary embodiment, the generating the multi-frequency interference fringe patterns based on the first pulse sequence and the second pulse sequence includes: generating a plurality of first sub-pulse sequences of different wavelength ranges based on the first pulse sequence, the plurality of first sub-pulse sequences converging with the second pulse sequence to form a one-to-one coincidence relationship in time and band.

In an exemplary embodiment, the generating the plurality of first sub-pulse sequences of different wavelength ranges based on the first pulse sequence, and the plurality of first sub-pulse sequences converging with the second pulse sequence to form the one-to-one coincidence relationship in time and band includes: forming a plurality of second sub-pulse sequences of different wavelength ranges based on the second pulse sequence, and the plurality of first sub-pulse sequences of different wavelength ranges converging with the plurality of second sub-pulse sequences of different wavelength ranges respectively to form the coincidence relationship in time and band.

In an exemplary embodiment, the image acquisition device includes a plurality of Charge Coupled Device (CCD) cameras corresponding to a plurality of second binomial color mirrors, the acquiring the optical signal reflected by the sample irradiated by the multi-frequency interference fringe patterns to obtain the three-dimensional topography of the sample includes: allowing the optical signal reflected by the samples irradiated by the multi-frequency interference fringe patterns to enter the plurality of CCD cameras respectively through the plurality of second binomial color mirrors, and acquiring, by the plurality of CCD cameras, optical signals passing through the plurality of second binomial color mirrors respectively to obtain the three-dimensional topography of the sample.

In an exemplary embodiment, the generating, by the ultrashort pulse laser light source, the detection beam includes: generating, by the ultrashort pulse laser light source, a pulse light; splitting the pulse light generated by the ultrashort pulse laser light source into the detection beam and a pump beam, the method further includes: ablating, by the pump beam, the sample.

In an exemplary embodiment, the ablating, by the pump beam, the sample includes: adjusting a polarization state of the pump beam to be different from that of the detection beam to ablate the sample.

In an exemplary embodiment, the pump beam having the polarization state adjusted is delayed through a delay platform, and then focused on the sample through a lens to ablate the sample.

In an exemplary embodiment, the plurality of second binomial color mirrors have cut-off frequencies corresponding to a plurality of first binomial color mirrors one by one.

After reading the above, those skilled in the art may also understand other aspects related to it.

As shown in the figure: 1 indicates an ultrashort pulse laser light source; 2 indicates a first beam splitting-combining mirror; 3 indicates a supercontinuum spectrum generator; 4 indicates a pulse separation delayer; 5 indicates a multi-frequency pulse interference fringe generator; 6 indicates a first reflector; 7 indicates a polarizer; 8 indicates a delay platform; 9 indicates a sample; 10 indicates an image acquisition device; 11 indicates a computer; 12 indicates a second beam splitting-combining mirror; 13 indicates a first binomial color mirror; 14 indicates a second binomial color mirror; 15 a second reflector; 16 indicates a third reflector; 17 indicates a third beam splitting-combining mirror; 18 indicates a fourth beam splitting-combining mirror; 19 indicates a fifth beam splitting-combining mirror; 20 indicates a fourth reflector; 21 indicates a fifth reflector; 22 indicates a sixth beam splitting-combining mirror; 23 indicates a third binomial color mirror; 24 indicates a fourth binomial color mirror; 25 indicates a sixth reflector; 26 indicates a first CCD; 27 indicates a second CCD; 28 indicates a third CCD.

DETAILED DESCRIPTION

The present disclosure will be further explained and illustrated with reference to the attached drawings and specific working modes, which is convenient for technicians to understand.

In this field, an ultrafast observation means is a pump detection technology, which may achieve a delay photography of femtosecond magnitude at the fastest, but it may only achieve a single-shot single-frame imaging, which is not applicable for those processes that are difficult to replicate or non-repeat, and cannot make more detailed observations of a continuous reaction process of a ultrafast laser and materials. Therefore, the imaging means not only needs to have ultrashort time interval, that is, imaging time resolution, but also need to be able to observe the continuous reaction process, that is, the imaging depth.

In addition, the above-mentioned imaging means are only two-dimensional imaging, including other ultrafast imaging observation technologies. However, in order to more intuitively show topography changes of materials ablated by an ultrashort pulse laser, three-dimensional imaging technologies may be adopted. At present, there are three-dimensional imaging technologies, but most of them are in a macroscopic visual field, in ultrafast imaging and micro-nano imaging, and there is little research on how to observe the continuous three-dimensional imaging with ultrahigh time resolution when the ultrashort pulse laser ablates an object. Therefore, the present disclosure may achieve an ultrafast multi-frame continuous imaging, and may also show the technology of three-dimensional topography changes of materials, which may be used to explain the mechanism of an interaction between the ultrashort pulse laser and the materials.

Figure 4:
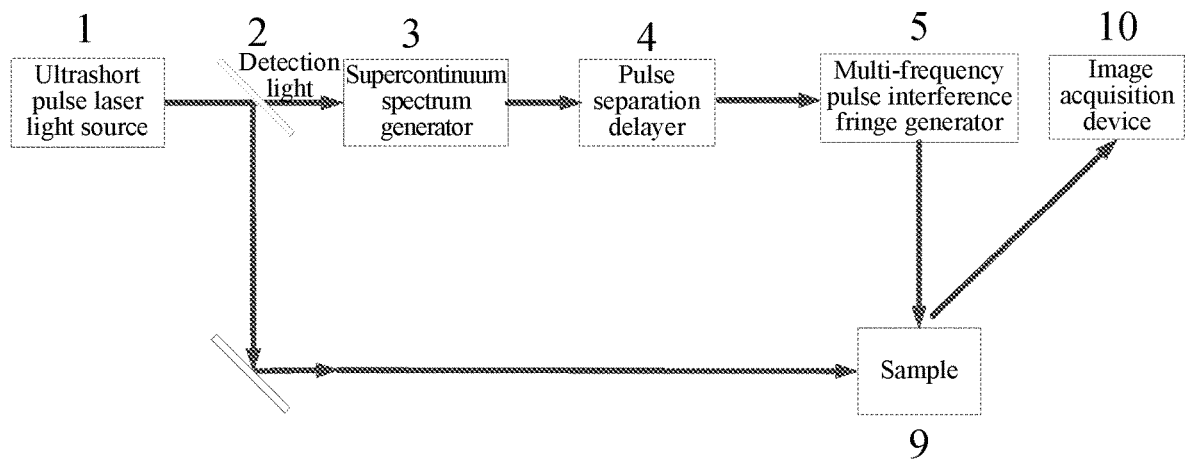
FIG. 4 is a schematic diagram of a three-dimensional imaging system according to an embodiment of the present disclosure.

An embodiment of the present disclosure provides a three-dimensional imaging system, and FIG. 4 is a schematic diagram of a three-dimensional imaging system according to an embodiment of the present disclosure. Referring to FIG. 4, the three-dimensional imaging system may include, for example, an ultrashort pulse laser light source 1, a supercontinuum spectrum generator 3, a pulse separation delayer 4, a multi-frequency pulse interference fringe generator 5, and an image acquisition device 10. The ultrashort pulse laser light source 1 is configured to generate a detection beam. The supercontinuum spectrum generator 3 is configured to generate a supercontinuum spectrum based on the detection beam passing through the supercontinuum spectrum generator 3. The pulse separation delayer 4 is configured to generate a continuous pulse sequence of different wavelengths with a time interval based on the supercontinuum spectrum. The multi-frequency pulse interference fringe generator 5 is configured to generate multi-frequency interference fringe patterns of different wavelength ranges with a time interval based on the continuous pulse sequence. The image acquisition device 10 is configured to acquire an optical signal reflected by a sample 9 irradiated by the multi-frequency interference fringe patterns, to obtain a three-dimensional topography of the sample.

Figure 1:
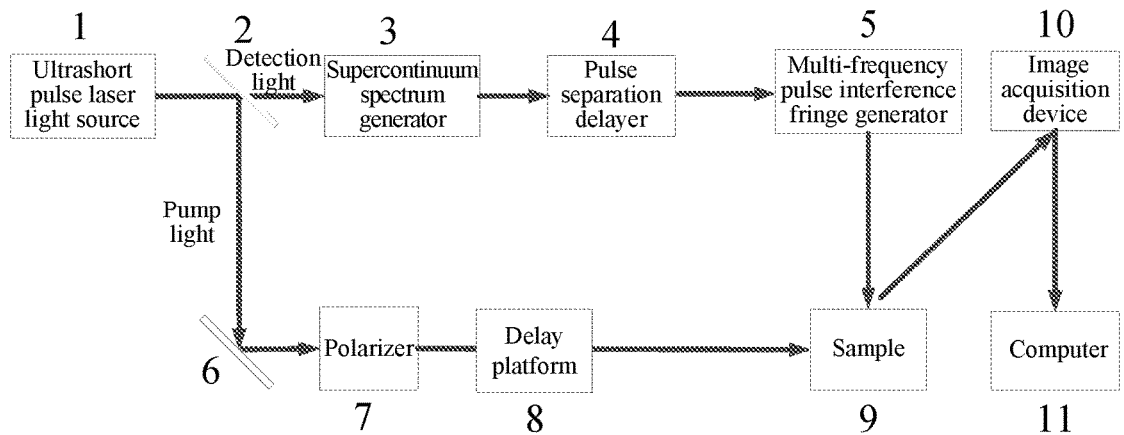
FIG. 1 is a schematic diagram of a three-dimensional imaging system according to an embodiment of the present disclosure.

An embodiment of the present disclosure also provides a three-dimensional imaging system, for example, an ultrafast continuous three-dimensional imaging system for ablating an object by an ultrashort pulse laser. FIG. 1 is a schematic diagram of a three-dimensional imaging system according to an embodiment of the present disclosure. Referring to FIG. 1, in an example, the three-dimensional imaging system may include an ultrashort pulse laser light source 1, a supercontinuum spectrum generator 3, a pulse separation delayer 4, a multi-frequency pulse interference fringe generator 5, a polarizer 7, a delay platform 8, a sample 9, an image acquisition device 10, a computer 11, a beam splitting-combining mirror, and a reflector.

The ultrashort pulse laser light source 1 is a nanosecond, picosecond or femtosecond laser, which may emit an ultrashort pulse laser of a single wavelength with nanosecond, picosecond or femtosecond pulse duration, has characteristics of ultrastrong energy and ultrashort time scale, and may ablate any material. The supercontinuum spectrum generator 3 may include a pair of focusing objective lens and photonic crystal fiber, which may generate supercontinuum spectrum with several frequency doubling layers and extremely wide spectrum. The pulse separation delayer 4 may comprise dispersive glass or optical fiber, and a delay time of multi-pulses may be controlled according to different thicknesses.

The multi-frequency pulse interference fringe generator 5 may include a second beam splitting-combining mirror 12, a third beam splitting-combining mirror 17, a fourth beam splitting-combining mirror 18, a fifth beam splitting-combining mirror 19, a first binomial color mirror 13, a second binomial color mirror 14, a second reflector 15 and a third reflector 16, which may generate interference fringe patterns of different wavelengths with a specific time interval. The polarizer 7 can change a polarization state of a pump light to avoid interference with a detection light for imaging. The delay platform 8 functions to adjust the delay between the pump light and the detection light, for example, to adjust a time interval between the pump light and interference fringes generated by the multi-frequency pulse interference fringe generator 5 reaching the sample. The image acquisition device 10 may include three CCD cameras with the same specifications and parameters for acquiring interference fringe patterns reflected by the sample. In an example, a three-dimensional contour in an image acquired by the CCD cameras may be extracted and restored based on a method of extracting the three-dimensional contour of the image in computer language.

Figure 5:
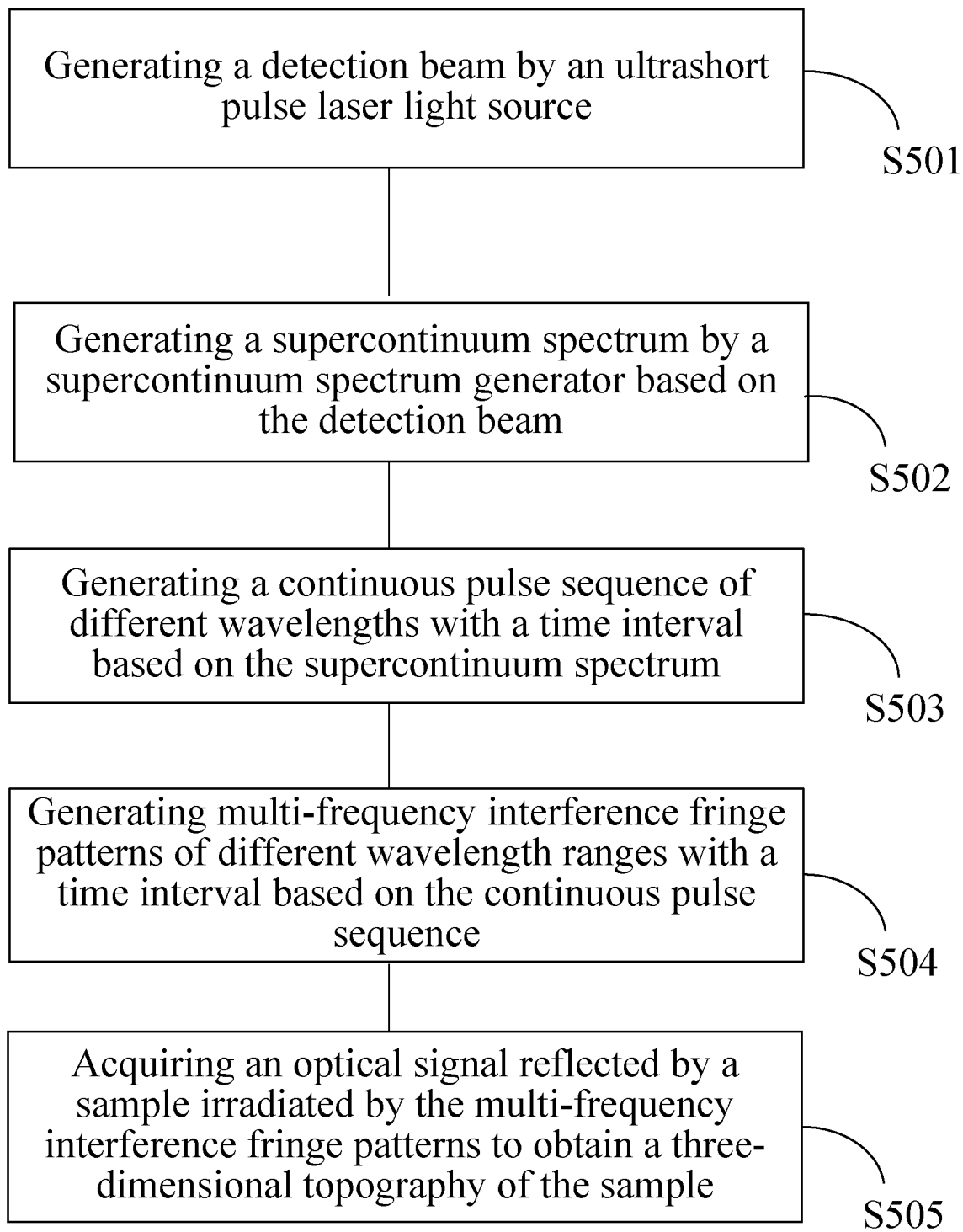
FIG. 5 is a flowchart of a three-dimensional imaging method according to an embodiment of the present disclosure.

FIG. 5 is a flowchart of a three-dimensional imaging method according to an embodiment of the present disclosure. Referring to FIG. 5, the three-dimensional imaging method includes the following steps.

At step S501, a detection beam is generated by using an ultrashort pulse laser light source;

At step S502, a supercontinuum spectrum is generated by a supercontinuum spectrum generator based on the detection beam;

At step S503, a continuous pulse sequence of different wavelengths with a time interval is generated based on the supercontinuum spectrum;

At step S504, multi-frequency interference fringe patterns of different wavelength ranges with a time interval are generated based on the continuous pulse sequence;

At step S505, an optical signal reflected by a sample irradiated by the multi-frequency interference fringe patterns is acquired to obtain a three-dimensional topography of the sample.

Figure 3:
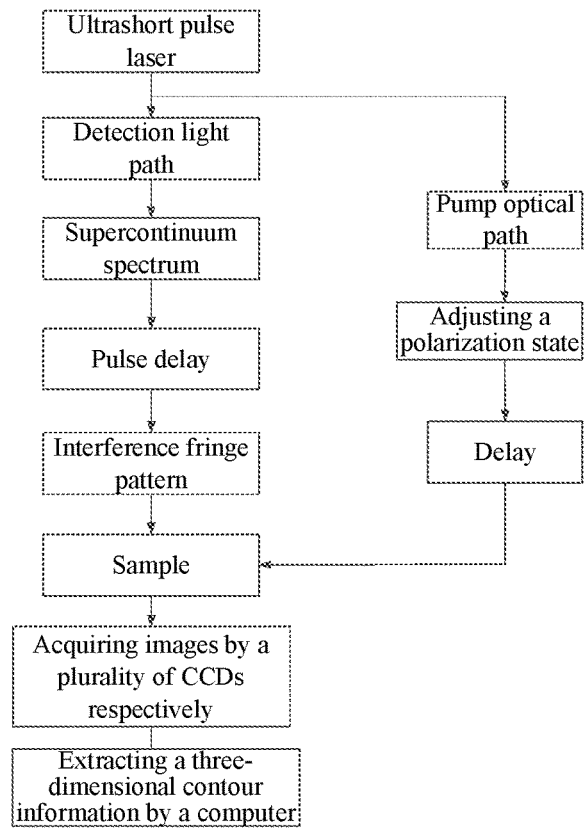
FIG. 3 is a flowchart of a three-dimensional imaging method according to an embodiment of the present disclosure.

FIG. 3 is a flow chart of a three-dimensional imaging method according to another embodiment of the present disclosure. For example, as shown in FIG. 3, an ultrafast continuous three-dimensional imaging method for an object ablated by an ultrashort pulse laser includes the following steps.

The ultrashort pulse laser light source 1 emits an ultrashort pulse laser beam, which then is divided into a pump beam and a detection beam by a third beam splitting-combining mirror, such as the first beam splitting-combining mirror 2 in FIG. 1.

The pump beam is adjusted by the polarizer 7 to have a different polarization state from a detection light, after being changed in direction by the first reflector 6, then passes through the delay platform 8, and then passes through a reflector, for example the fourth reflector 20 and the fifth reflector 21, and is focused on an surface of the sample 9 by a lens for ablation.

The detection beam generates a supercontinuum spectrum $\lambda_n$ with several frequency doubling layers and extremely wide spectrum, after passing through the supercontinuum spectrum generator 3, and generates a continuous pulse sequence (for example, a continuous sub-pulse train) of different wavelengths with a specific time interval after passing through the pulse separation delayer 4.

The continuous pulse sequence is equally divided into a first pulse sequence and a second pulse sequence by a first beam splitting-combining mirror. The first beam splitting-combining mirror is, for example, the second beam splitting-combining mirror 12 in FIG. 2, which equally divides the continuous pulse sequence into a first pulse sequence and a second pulse sequence, for example, pulse trains I and II.

The pulse train I generates a plurality of first sub-pulse sequences of different wavelength ranges after passing through a plurality of first binomial color mirror, and the first sub-pulse sequences converge with the second pulse sequence (for example, the pulse train II reflected by the third reflector 16) to form a one-to-one coincidence relationship in time and band.

Figure 2:
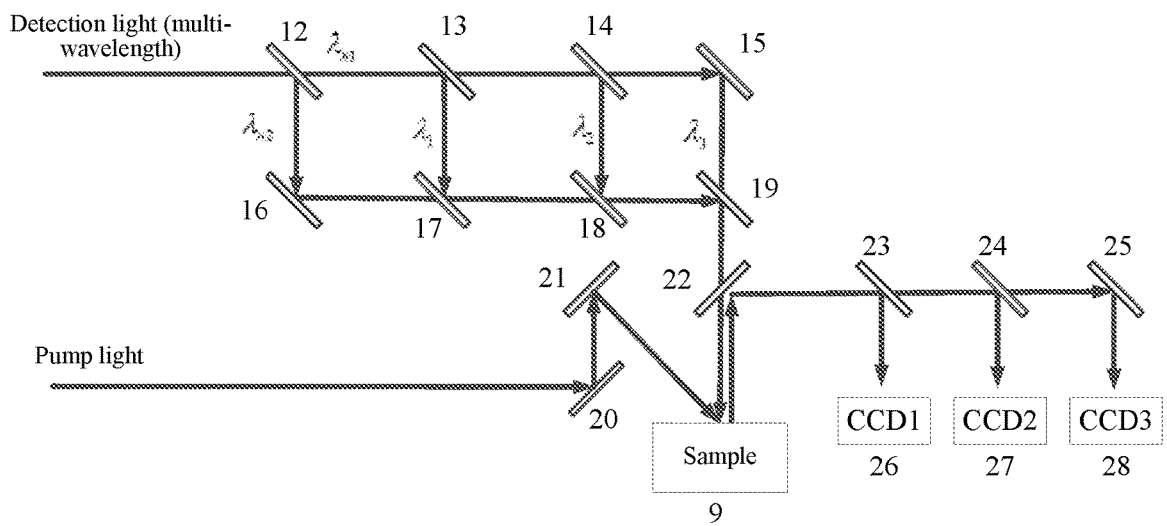
FIG. 2 is a schematic diagram of a continuous three-dimensional imaging optical path according to an embodiment of the present disclosure.

The plurality of first binomial color mirror are, for example, the first binomial color mirror 13, the second binomial color mirror 14 and the second reflector 15 in FIG. 2, and the first sub-pulse sequences are, for example, three sub-pulses $\lambda_1$, $\lambda_2$, $\lambda_3$ of different wavelength ranges.

The pulse train II is split into a plurality of second sub-pulse sequences through a plurality of second beam splitting-combining mirrors (for example the third beam splitting-combining mirror 17, the fourth beam splitting-combining mirror 18 and the fifth beam splitting-combining mirror 19 in FIG. 2). The first sub-pulse sequences of the pulse train I of different wavelength ranges converge with the second sub-pulse sequences respectively to form a one-to-one coincidence relationship in time and band.

For example, three sub-pulses $\lambda_1$, $\lambda_2$, $\lambda_3$ of the pulse train I of different wavelength ranges and the pulse train II reflected by the third reflector 16 converge at the third beam splitting-combining mirror 17, the fourth beam splitting-combining mirror 18 and the fifth beam splitting-combining mirror 19, to form a one-to-one coincidence relationship in time and band. In this way, frequency spectrums of different band ranges form interference fringes separated from each other in time.

Then the interference fringes irradiate the surface of the sample 9 after passing through the sixth beam splitting-combining mirror 22, are reflected by the sample 9 and reflected again by the sixth beam splitting-combining mirror 22, and respectively enter corresponding the plurality of CCDs, and the CCDs respectively acquire optical signals reflected by the plurality of second binomial color mirrors to obtain an surface image of the sample, thus obtaining a three-dimensional topography of the sample.

For example, the reflected light enters a plurality of CCDs (for example, the first CCD 26, the second CCD 27 and the third CCD 28) corresponding to the plurality of second binomial color mirrors, respectively, after passing through the plurality of second binomial color mirrors, (for example, the third binomial color mirror 23, the fourth binomial color mirror 24 and the sixth reflector 25 in FIG. 2), and then. Finally, the three-dimensional contour of the surface of the object is extracted and restored by a method for extracting a three-dimensional contour of an image on a computer, to draw a three-dimensional map.

In an embodiment, the ultrashort pulse laser light source 1 emits a pulse laser with a pulse width of 50*fs* and horizontal polarization, which is reflected as a pump beam and transmitted as a detection beam respectively through the first beam splitting-combining mirror 2. The pump beam is adjusted in direction by the first reflector 6, then is converted into a vertically polarized light by the polarizer 7, and then focused on the surface of the sample 9 by a lens for ablation, after passing through the delay platform 8, the fourth reflector 20 and the fifth reflector 21. During the propagation of the pump beam, the detection beam firstly enters the super-continuum spectrum generator 3 including an objective lens, a photonic crystal fiber and an objective lens to generate supercontinuum spectrum with a frequency spectrum of 350 nm-1100 nm, and then the frequency spectrum is separated in time through the pulse separator 4, and time intervals between respective frequency spectrums may be several femtoseconds magnitude. A pulse sequence $\lambda_n$ with multi-frequency spectrum (350 nm-1100 nm) enters the multi-pulse interference fringe generator 5, and is firstly equally divided into sub-pulse sequences $\lambda_{n1}$ and $\lambda_{n2}$ by the second beam splitting-combining mirror 12. Three sub-pulses $\lambda_1$ (350 nm-640 nm), $\lambda_2$ (640 nm-875 nm) and $\lambda_3$ (875 nm-1100 nm) of different wavelength ranges are generated respectively after one of the sub-pulse sequence $\lambda_{n1}$ passes through the first binomial color mirror 13 (a cut-off wavelength of 640 nm), the second binomial color mirror 14 (a cut-off wavelength of 875 nm) and the second reflector 15. $\lambda_1$ is combined with $\lambda_{n2}$ at the third beam splitting-combining mirror 17, and an interference is formed in a band range corresponding to $\lambda_{n2}$, so do for $\lambda_2$ and $\lambda_3$. Finally, $\lambda_1$, $\lambda_2$, $\lambda_3$ and $\lambda_{n2}$ form a one-to-one coincidence relationship in time and band, and the spectrums with different band ranges form interference fringes separated from each other in time, which are then irradiated on the surface of the sample 9 through the sixth beam splitting-combining mirror 22. Interference fringes with topographies of the surface of the sample 9 at different times are reflected back to the sixth beam splitting-combining mirror 22 to be reflected again, and then enter the first CCD 26, the second CCD 27 and the third CCD 28 respectively, after passing through the third binomial color mirror 23, the fourth binomial color mirror 24 and the sixth reflector 25. Finally, the three-dimensional contour of the surface of the object is extracted and restored by a method for extracting a three-dimensional contour of an image on the computer to draw a continuous three-dimensional diagram. In this way, obtaining the three-dimensional contour information of the surface of the object with ultrahigh time resolution is completed, and a time resolution between the respective images is several femtoseconds, and a maximum spatial resolution is 1.22 μm.

Compared with other ultrafast continuous imaging technologies, the ultrafast continuous three-dimensional imaging system and method for ablating objects by ultrashort pulse laser according to the embodiment of the present application may achieve ultrafast continuous three-dimensional observation in the process of ablating material of objects by ultrashort pulse laser, have a time resolution of femtosecond-picosecond magnitude, present the three-dimensional topography of the surface of objects during processing, enhance the continuous observability in an experimental process, and play an important auxiliary role for the mechanism research of ablating objects by ultrashort pulse laser.

The above specific description further explains the object, technical schemes, and beneficial effects of the present disclosure. It should be understood that the above description is only a specific embodiment of the present disclosure and is not used to limit the protection scope of the present disclosure. Any modification, equivalent substitution and improvement made within the spirit and principle of the present disclosure should be included in the protection scope of the present disclosure.

What is claimed is:

1. A three-dimensional imaging system, comprising:
   an ultrashort pulse laser light source, configured to generate a detection beam;
   a supercontinuum spectrum generator, configured to generate a supercontinuum spectrum based on the detection beam passing through the supercontinuum spectrum generator;
   a pulse separation delayer, configured to generate a continuous pulse sequence of different wavelengths with a time interval based on the supercontinuum spectrum;
   a multi-frequency pulse interference fringe generator, configured to generate multi-frequency interference fringe patterns of different wavelength ranges with a time interval based on the continuous pulse sequence;
   an image acquisition device, configured to acquire an optical signal reflected by a sample irradiated by the multi-frequency interference fringe patterns to obtain a three-dimensional topography of the sample; and a first beam splitting-combining mirror, configured to equally divide the continuous pulse sequence generated by the pulse separation delayer into a first pulse sequence and a second pulse sequence;

wherein the multi-frequency pulse interference fringe generator generates the multi-frequency interference fringe patterns based on the first pulse sequence and the second pulse sequence.

2. The system according to claim 1, further comprising a plurality of first binomial color mirrors, wherein a plurality of first sub-pulse sequences of different wavelength ranges are generated by the first pulse sequence through the plurality of first binomial color mirrors, respectively, and the plurality of first sub-pulse sequences converge with the second pulse sequence to form a one-to-one coincidence relationship in time and band.

3. The system according to claim 2, further comprising a plurality of second beam splitting-combining mirrors, the plurality of second beam splitting-combining mirrors are configured to split the second pulse sequence to form a plurality of second sub-pulse sequences of different wavelength ranges, and the plurality of first sub-pulse sequences of different wavelength ranges converge with the plurality of second sub-pulse sequences of different wavelength ranges respectively, to form the one-to-one coincidence relationship in time and band.

4. The system according to claim 2, further comprising a plurality of second binomial color mirrors, wherein the image acquisition device comprises a plurality of Charge Coupled Device (CCD) cameras corresponding to the plurality of second binomial color mirrors, the optical signal reflected by the samples irradiated by the multi-frequency interference fringe patterns respectively enter the plurality of CCD cameras through the plurality of second binomial color mirrors, and the plurality of CCD cameras respectively acquire optical signals passing through the plurality of second binomial color mirrors to obtain the three-dimensional topography of the sample.

5. The system according to claim 3, further comprising a third beam splitting-combining mirror, the third beam splitting-combining mirror is configured to split light generated by the ultrashort pulse laser light source into the detection beam and a pump beam, and the pump beam is used for ablating the sample.

6. The system according to claim 5, further comprising a polarizer, wherein the polarizer is configured to adjust a polarization state of the pump beam to be different from that of the detection beam to ablate the sample.

7. The system according to claim 6, further comprising a delay platform and a lens, wherein the pump beam having the polarization state adjusted is delayed through the delay platform, and then is focused on the sample through the lens to ablate the sample.

8. The system according to claim 4, wherein the plurality of first binomial color mirrors have different cut-off frequencies, and the plurality of second binomial color mirrors have cut-off frequencies corresponding to the plurality of first binomial color mirrors one by one.

9. The system according to claim 1, wherein the supercontinuum spectrum generator comprises a focusing objective lens and a photonic crystal fiber.

10. The system according to claim 4, wherein the plurality of CCD cameras are located at different positions of the three-dimensional imaging system and respectively receive interference fringe patterns with sample contour information reflected by the sample.

11. A three-dimensional imaging method, comprising:

generating, by an ultrashort pulse laser source, a detection beam;

generating, by a supercontinuum spectrum generator, based on the detection beam passing through the supercontinuum spectrum generator, a supercontinuum spectrum;

generating a continuous pulse sequence of different wavelengths with a time interval based on the supercontinuum spectrum;

generating multi-frequency interference fringe patterns of different wavelength ranges with a time interval based on the continuous pulse sequence; and acquiring an optical signal reflected by a sample irradiated by the multi-frequency interference fringe patterns to obtain a three-dimensional topography of the sample;

wherein generating multi-frequency interference fringe patterns of different wavelength ranges with the time interval based on the continuous pulse sequence comprises: equally dividing the continuous pulse sequence into a first pulse sequence and a second pulse sequence; and generating the multi-frequency interference fringe patterns based on the first pulse sequence and the second pulse sequence.

12. The method according to claim 11, wherein generating the multi-frequency interference fringe patterns based on the first pulse sequence and the second pulse sequence comprises:

generating a plurality of first sub-pulse sequences of different wavelength ranges by the first pulse sequence through a plurality of first binomial color mirrors, the plurality of first sub-pulse sequences converging with the second pulse sequence to form a one-to-one coincidence relationship in time and band.

13. The method according to claim 12, wherein generating the plurality of first sub-pulse sequences of different wavelength ranges by the first pulse sequence through a plurality of first binomial color mirrors, and the plurality of first sub-pulse sequences converging with the second pulse sequence to form the one-to-one coincidence relationship in time and band comprises:

forming a plurality of second sub-pulse sequences of different wavelength ranges based on the second pulse sequence, and the plurality of first sub-pulse sequences of different wavelength ranges converging with the plurality of second sub-pulse sequences of different wavelength ranges respectively to form the coincidence relationship in time and band.

14. The method according to claim 12, wherein the image acquisition device comprises a plurality of Charge Coupled Device (CCD) cameras corresponding to a plurality of second binomial color mirrors, acquiring the optical signal reflected by the sample irradiated by the multi-frequency interference fringe patterns to obtain the three-dimensional topography of the sample comprises:

allowing the optical signal reflected by the samples irradiated by the multi-frequency interference fringe patterns to enter the plurality of CCD cameras respectively through the plurality of second binomial color mirrors, and acquiring, by the plurality of CCD cameras, optical signals passing through the plurality of second binomial color mirrors respectively to obtain the three-dimensional topography of the sample.

15. The method according to claim 11, wherein generating, by the ultrashort pulse laser light source, the detection beam comprises:

generating, by the ultrashort pulse laser light source, a pulse light;

splitting the pulse light generated by the ultrashort pulse laser light source into the detection beam and a pump beam, the method further comprises:

ablating, by the pump beam, the sample.

16. The method according to claim 15, wherein ablating, by the pump beam, the sample comprises:

adjusting a polarization state of the pump beam to be different from that of the detection beam to ablate the sample.

17. The method according to claim 16, wherein the pump beam having the polarization state adjusted is delayed through a delay platform, and then focused on the sample through a lens to ablate the sample.

18. The method according to claim 14, wherein the plurality of second binomial color mirrors have cut-off frequencies corresponding to a plurality of first binomial color mirrors one by one.

\* \* \* \* \*